US011110939B2

(12) United States Patent
Sohoni et al.

(10) Patent No.: US 11,110,939 B2
(45) Date of Patent: Sep. 7, 2021

(54) SYSTEMS AND METHODS FOR PROVIDING ACTIVE DRIVER FEEDBACK DURING ELECTRIFIED VEHICLE OPERATION

(71) Applicant: FORD GLOBAL TECHNOLOGIES, LLC, Dearborn, MI (US)

(72) Inventors: Pallav Sohoni, Farmington Hills, MI (US); Erik J. Christen, Royal Oak, MI (US); Evan Perry, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 631 days.

(21) Appl. No.: 15/925,048

(22) Filed: Mar. 19, 2018

(65) Prior Publication Data

US 2019/0283779 A1 Sep. 19, 2019

(51) Int. Cl.
| | | |
|---|---|---|
| *G06F 7/70* | (2006.01) | |
| *B60W 50/16* | (2020.01) | |
| *B60W 40/09* | (2012.01) | |
| *B60W 30/18* | (2012.01) | |
| *B60W 10/08* | (2006.01) | |
| *B60W 10/184* | (2012.01) | |
| *B60T 17/22* | (2006.01) | |
| *B60T 1/10* | (2006.01) | |
| *B60L 7/10* | (2006.01) | |
| *B60W 50/00* | (2006.01) | |
| *B60W 50/14* | (2020.01) | |

(52) U.S. Cl.
CPC ............... *B60W 50/16* (2013.01); *B60L 7/10* (2013.01); *B60T 1/10* (2013.01); *B60T 17/22* (2013.01); *B60W 10/08* (2013.01); *B60W 10/184* (2013.01); *B60W 30/18127* (2013.01); *B60W 40/09* (2013.01); *B60W 50/0097* (2013.01); *B60K 2370/16* (2019.05); *B60L 2250/16* (2013.01); *B60L 2260/52* (2013.01); *B60L 2260/54* (2013.01); *B60W 2050/146* (2013.01); *B60W 2510/244* (2013.01); *B60W 2540/215* (2020.02)

(58) Field of Classification Search
CPC .. B60W 50/16; B60L 7/10; B60T 1/10; B60T 17/22
See application file for complete search history.

(56) References Cited

U.S. PATENT DOCUMENTS

| | | | |
|---|---|---|---|
| 7,603,228 | B2 | 10/2009 | Coughlin |
| 7,798,578 | B2 | 9/2010 | Lewis et al. |
| 2011/0241864 | A1 | 10/2011 | Fujiki et al. |
| 2012/0179347 | A1 | 7/2012 | Aldighieri et al. |
| 2014/0032062 | A1 | 1/2014 | Baer et al. |
| 2016/0084661 | A1 | 3/2016 | Gautama et al. |
| 2016/0103488 | A1* | 4/2016 | Levesque ............... G09G 5/003 345/156 |
| 2017/0355377 | A1* | 12/2017 | Vijaya Kumar .. B60W 50/0098 |
| 2018/0129202 | A1* | 5/2018 | Guo ..................... G05D 1/0061 |

* cited by examiner

*Primary Examiner* — Adam M Alharbi
(74) *Attorney, Agent, or Firm* — David B. Kelley; Carlson, Gaskey & Olds (57) ABSTRACT

This disclosure describes vehicle systems and methods for providing active driver feedback during electrified vehicle operation. An exemplary method provides haptic feedback of a driving behavior through a smart device worn by a driver of the electrified vehicle during a braking or acceleration event of an electrified vehicle.

19 Claims, 6 Drawing Sheets

SYSTEMS AND METHODS FOR PROVIDING ACTIVE DRIVER FEEDBACK DURING ELECTRIFIED VEHICLE OPERATION

TECHNICAL FIELD

This disclosure relates to electrified vehicles, and more particularly to systems and methods for providing active driver feedback during operation of electrified vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

Many electrified vehicles utilize regenerative braking to recapture energy that can be subsequently reused to propel the vehicle. Regenerative braking is the conversion of the vehicle's kinetic energy during braking events into chemical energy that can be stored in the vehicle's battery pack. Some drivers may not capture full regenerative braking energy because of their driving habits, thereby resulting in reduced fuel economy and customer dissatisfaction.

SUMMARY

A method according to an exemplary aspect of the present disclosure includes, among other things, providing haptic feedback of a driving behavior through a smart device worn by a driver of the electrified vehicle during a braking or acceleration event of an electrified vehicle.

In a further non-limiting embodiment of the foregoing method, the smart device is a smart watch or a smart band.

In a further non-limiting embodiment of either of the foregoing methods, providing the haptic feedback includes commanding the smart device to vibrate.

In a further non-limiting embodiment of any of the foregoing methods, commanding the smart device to vibrate includes vibrating the smart device at an intensity that is proportional to a distance that a current brake pedal position is from an ideal brake pedal position for recapturing maximum regenerative braking energy.

In a further non-limiting embodiment of any of the foregoing methods, commanding the smart device to vibrate includes vibrating the smart device at an intensity that is proportional to a distance that a current accelerator pedal position is from an ideal accelerator pedal position for achieving maximum fuel economy.

In a further non-limiting embodiment of any of the foregoing methods, providing the haptic feedback during the braking event includes coaching the driver, via the haptic feedback, to alter the driving behavior.

In a further non-limiting embodiment of any of the foregoing methods, altering the driving behavior includes changing a current brake pedal position.

In a further non-limiting embodiment of any of the foregoing methods, providing the haptic feedback during the acceleration event includes coaching the driver, via the haptic feedback, to alter the driving behavior.

In a further non-limiting embodiment of any of the foregoing methods, altering the driving behavior includes changing a current accelerator pedal position.

In a further non-limiting embodiment of any of the foregoing methods, providing the haptic feedback includes instructing the smart device to provide a first haptic feedback of a first intensity in response to a first braking event in which a first amount of regenerative braking energy is recaptured and to provide a second haptic feedback of a second, different intensity in response to a second braking event in which a second, different amount of braking energy is recaptured.

In a further non-limiting embodiment of any of the foregoing methods, the second, different intensity is less than the first intensity if the second, different amount of regenerative braking energy is greater than the first amount of regenerative braking energy.

In a further non-limiting embodiment of any of the foregoing methods, providing the haptic feedback includes instructing the smart device to provide a first haptic feedback of a first intensity in response to a first acceleration event that achieves a first acceleration efficiency and to provide a second haptic feedback of a second, different intensity in response to a second acceleration event that achieves a second, different acceleration efficiency.

In a further non-limiting embodiment of any of the foregoing methods, the second, different intensity is less than the first intensity if the second, different acceleration efficiency is greater than the first acceleration efficiency.

In a further non-limiting embodiment of any of the foregoing methods, the method includes receiving a signal indicating that a brake or accelerator coach feature has been enabled by the driver prior to providing the haptic feedback.

In a further non-limiting embodiment of any of the foregoing methods, the method includes detecting a presence of the smart device within a passenger cabin of the electrified vehicle prior to providing the haptic feedback.

An electrified vehicle according to another exemplary aspect of the present disclosure includes, among other things, a brake pedal, an accelerator pedal, and a control module configured to instruct a smart device worn by a driver of the electrified vehicle to provide haptic feedback to the driver if a position of the brake pedal is different from an ideal brake pedal position during a braking event or if a position of the accelerator pedal is different from an ideal accelerator pedal position during an acceleration event.

In a further non-limiting embodiment of the foregoing electrified vehicle, a first sensor is configured to detect the position of the brake pedal and a second sensor is configured to detect the position of the accelerator pedal.

In a further non-limiting embodiment of either of the foregoing vehicle systems, a communication system includes a first Bluetooth Low Energy (BLE) transceiver configured to communicate with a second BLE transceiver of the smart device.

In a further non-limiting embodiment of any of the foregoing vehicle systems, a human machine interface system has at least one user interface configured to display visual feedback to the driver during the braking event or the acceleration event.

In a further non-limiting embodiment of any of the foregoing vehicle systems, the human machine interface system includes a second user interface configured to enable or disable a brake coach feature or an acceleration coach feature of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for providing active driver feedback during electrified vehicle operation. An exemplary method provides haptic feedback of a driving behavior through a smart device worn by a driver of the electrified vehicle during a braking or acceleration event of an electrified vehicle. These and other features are discussed in greater detail in the following paragraphs of this detailed description.

Figure 1:
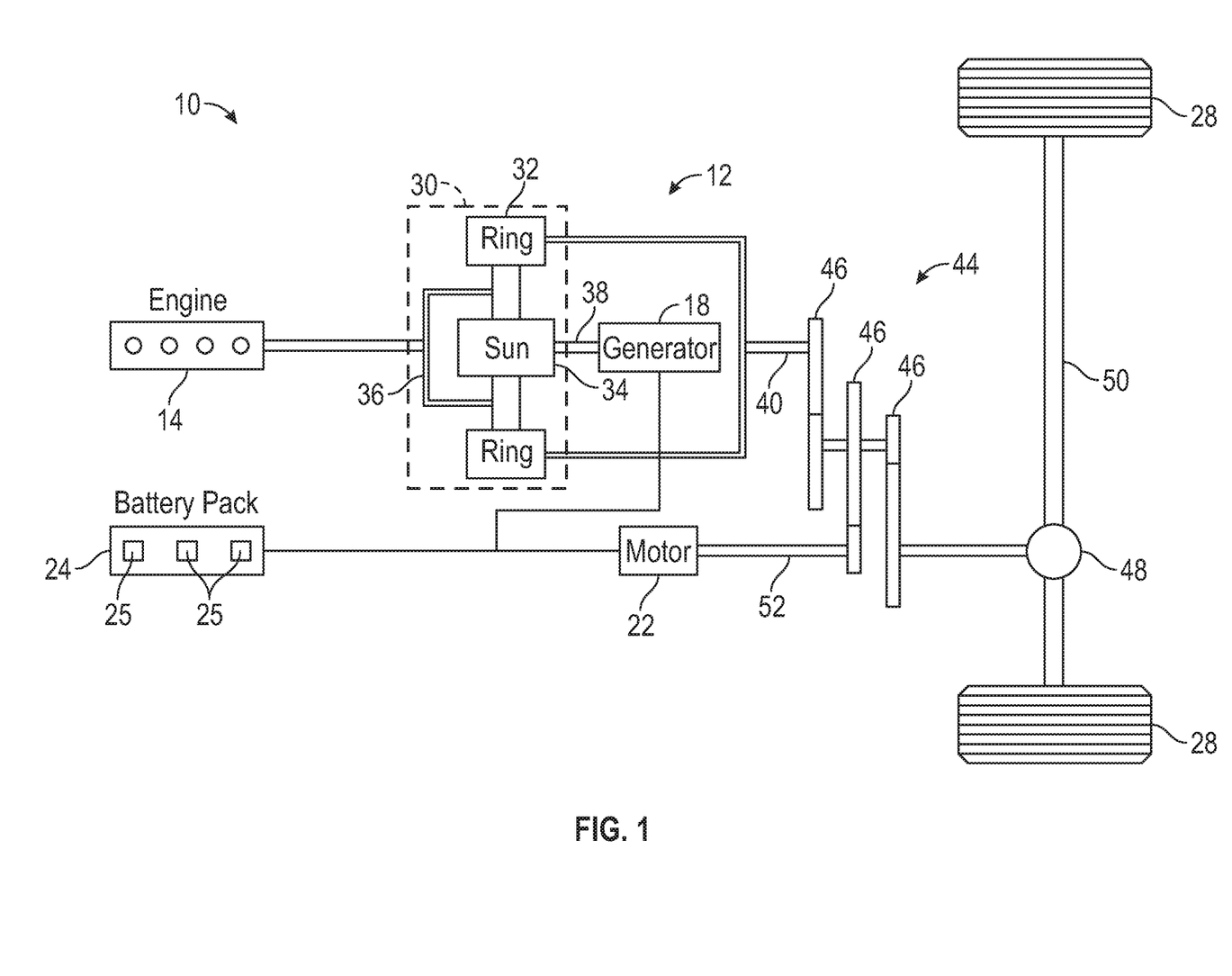
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), start/stop hybridized electric vehicles, and modular hybrid transmission electric vehicles.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In an embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
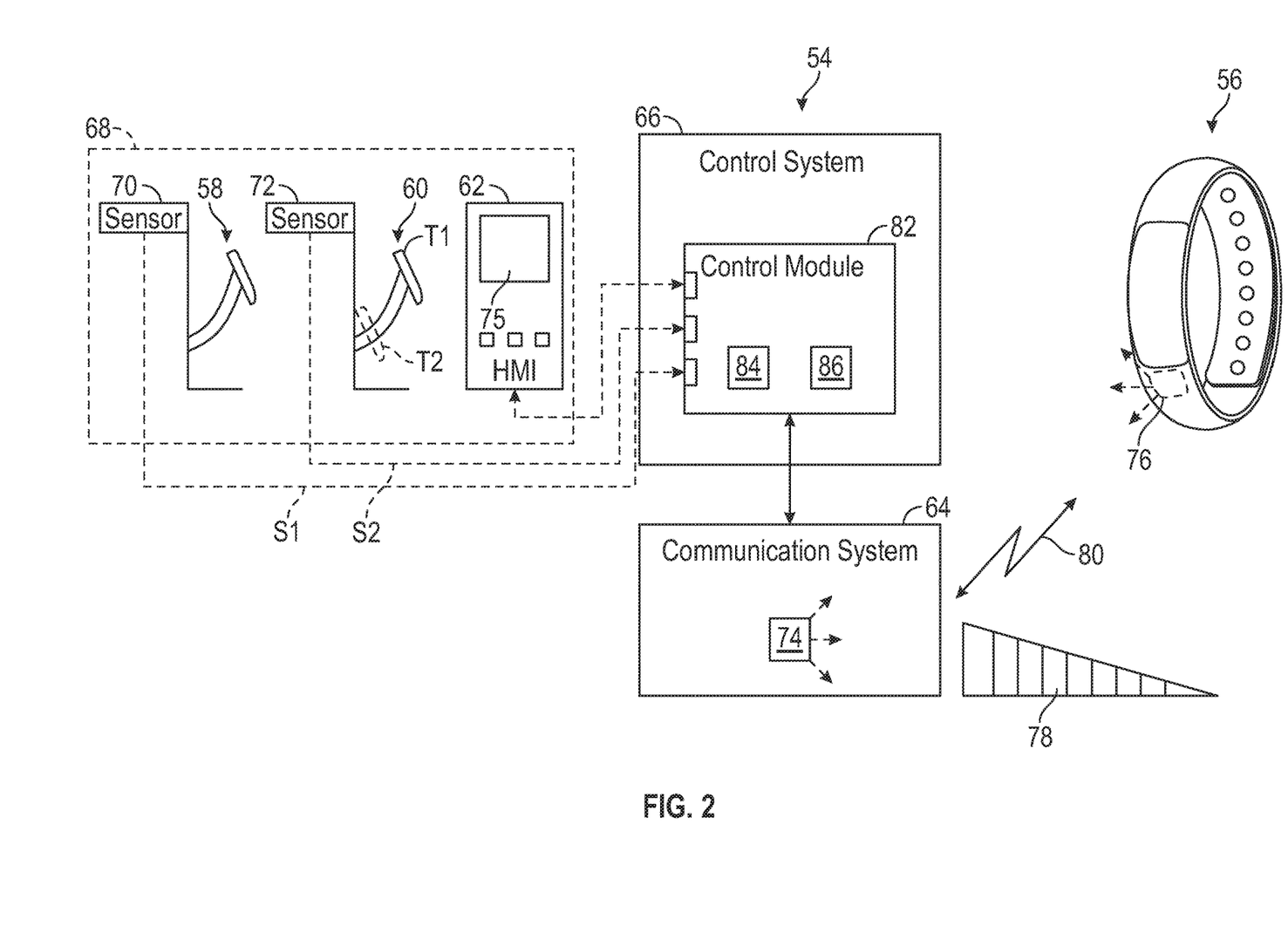
FIG. 2 is a block diagram of a vehicle system of an electrified vehicle.

FIG. 2 is a highly schematic depiction of a vehicle system 54 that may be employed within an electrified vehicle, such as the electrified vehicle 12 of FIG. 1. The vehicle system 54 may be employed to provide active feedback of a driving behavior to a driver during operation of the electrified vehicle 12. For example, the vehicle system 54 may command that haptic feedback be provided through a smart device 56 worn by the driver during braking or acceleration events of the electrified vehicle 12. The smart device 56 may be a smart watch, a smart band, or any other wearable smart device.

In an embodiment, the vehicle system 54 includes a brake pedal 58, an accelerator pedal 60, a human machine interface (HMI) system 62, a communication system 64, and a control system 66. Each of these devices/systems is described in greater detail below.

The brake pedal 58 may be located within a passenger cabin 68 of the electrified vehicle 12. The brake pedal 58 is actuated by the driver to decelerate the electrified vehicle 12. This may be referred to as a braking event. The brake pedal 58 may be depressed toward the floor board to activate regenerative braking and/or to activate friction brakes (not shown) of the electrified vehicle 12. In an embodiment, the brake pedal 58 is an electronic device that includes a sensor 70 for indicating a pedal position when the brake pedal 58 is depressed. The sensor 70 may generate brake pedal position signals S1 that are communicated to the control system 66 as pressure is applied to the brake pedal 58. The brake pedal position signals S1 may be indicative of an amount of pressure applied to the brake pedal 58 at any given time.

The accelerator pedal 60 is also located within the passenger cabin 68. The accelerator pedal 60 may be actuated by a driver to request a torque, power, or drive command for accelerating the electrified vehicle 12. This may be referred to as an acceleration event. The accelerator pedal 60 may be positioned at a plurality of accelerator pedal positions between fully tipped out (shown as position T1, also called lift pedal) and tip in (shown as position T2). For example, at a 0% pedal position, the accelerator pedal 60 is completely tipped out (i.e., the driver's foot has been removed from the accelerator pedal 60), and at a 100% pedal position, the accelerator pedal 60 is completely tipped in (i.e., the driver's foot has depressed the accelerator pedal 60 down to the floor board of the passenger cabin 68). In an embodiment, the accelerator pedal 60 is an electronic device that includes a sensor 72 for indicating the accelerator pedal position during acceleration events. The sensor 72 may generate accelerator pedal position signals S2 that are communicated to the control system 66 as the accelerator pedal 60 is depressed and/or released.

The HMI system 62, portions of which may also be located within the passenger cabin 68 of the electrified vehicle 12, may include a user interface 75. Although a single user interface 75 is shown in FIG. 2, the HMI system 62 could include multiple user interfaces located at various in-dash locations within the passenger cabin 68. A driver or passenger of the electrified vehicle 12 may interact with the user interface 75 via a touch screen, tactile buttons, audible speech, speech synthesis, etc. The driver/passenger can either enter information into the user interface 75 or the user interface 75 can display information to the user. For example, in an embodiment, the control system 66 can communicate with the driver/passenger by displaying information on one or more of the user interfaces 75 of the HMI system 62, such for coaching the driver to improve fuel economy during braking and acceleration events.

The communication system 64 is configured to communicate with the smart device 56, which is a wearable device worn by the driver of the electrified vehicle 12. The communication system 64 may include one or more wireless devices 74 that facilitate the detection of and communication with nearby devices such as the smart device 56. In an embodiment, the wireless device 74 is a Bluetooth Low Energy (BLE) transceiver configured to receive and/or emit low energy Bluetooth signals as a way to detect and communicate with the smart device 56.

As shown schematically, the smart device 56 may also include a wireless device 76 (e.g., another BLE transceiver) configured to communicate with the wireless device 74 of the communication system 64 over a wireless connection 78. The wireless connection 78 may be a BLE connection, a Wi-Fi connection, a near field communication (NFC) connection, a radio-frequency connection, or any other type of wireless connection. The wireless device 74 of communication system 64 may periodically (e.g., about every half-second or any other time interval) broadcast wireless signals 80 that include information pertinent to a current braking or acceleration event. The wireless signals 80 may be received by the wireless device 76 of the smart device 56. Based on the information embedded within the wireless signals 80, the smart device 56 can provide haptic feedback of a driving behavior to the driver of the electrified vehicle 12, as discussed in greater detail below.

The control system 66 may be part of an overall vehicle control system or could be a separate control system that communicates with the vehicle control system. The control system 66 may include one or more control modules 82 equipped with executable instructions for interfacing with and commanding operation of various components of the vehicle system 54 (e.g., the HMI system 62, the communication system 64, etc.). Each control module 82 of the control system 66 may include a processing unit 84 and non-transitory memory 86 for executing the various control strategies and modes of the vehicle system 54.

Figure 3:
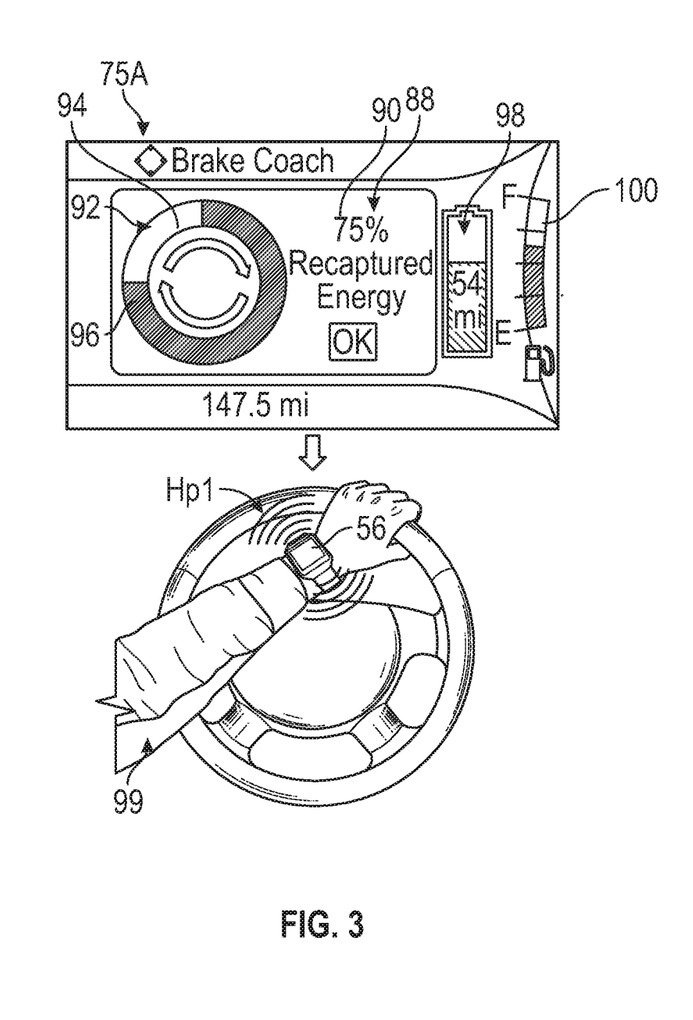
FIGS. 3 and 4 schematically illustrate a brake coach feature of an electrified vehicle.
Figure 4:
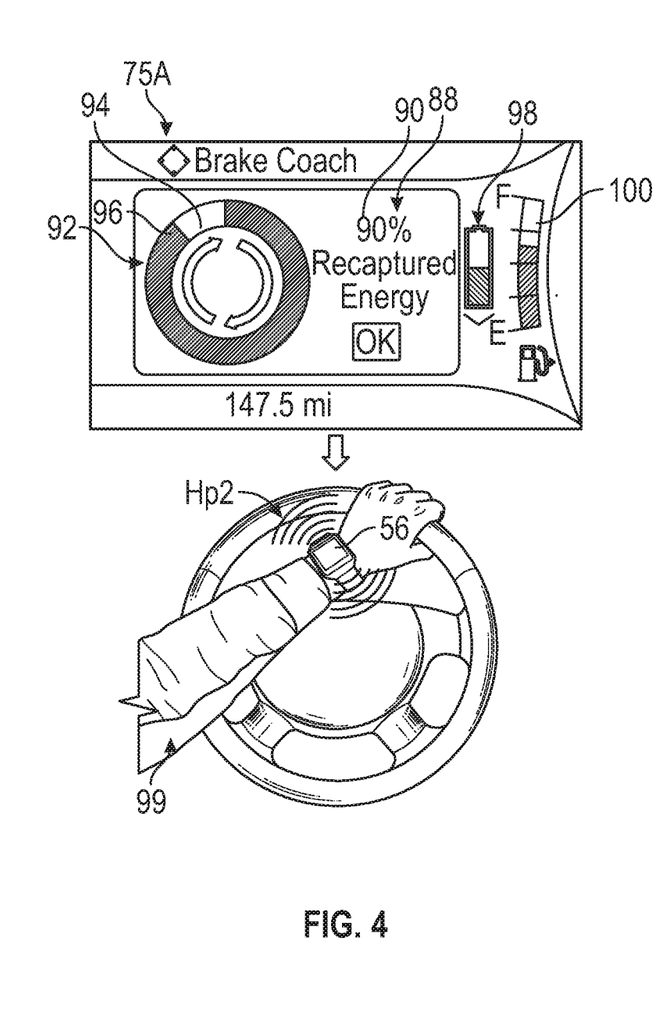

In an embodiment, the control module 82 of the control system 66 is programmed to execute a brake coach feature of the electrified vehicle 12. The brake coach feature is schematically illustrated in FIGS. 3 and 4 (with continued reference to FIG. 2).

A first aspect of the brake coach feature is the ability to provide a driver 99 with visual braking behavior feedback on a user interface 75A of the HMI system 62 during braking events. The user interface 75A may include a braking efficiency indicator 88 for digitally displaying a braking efficiency score 90 alphanumerically. The user interface 75A may additionally include a braking efficiency gauge 92 for conveying the braking efficiency score 90 graphically. The braking efficiency gauge 92 may include a circular ring 94 and a status bar 96 adapted to move within the circular ring 94 to display an amount of regenerative braking energy that is recaptured in relation to the total braking amount during the braking event. The location at which the status bar 96 ends within the circular ring 94 may correspond to the braking efficiency score 90. The user interface 75A may also include a state of charge indicator 98 for graphically illustrating the amount of energy stored in the battery pack 24 (see FIG. 1) and a fuel level indicator 100 for graphically illustrating the amount of fuel stored in the fuel tank for powering the engine 14 (see FIG. 1).

In addition to displaying visual braking behavior feedback on the user interface 75A, the brake coach feature may be configured to provide haptic braking behavior feedback during braking events through the smart device 56 worn by the driver 99 of the electrified vehicle 12. The control module 82 may automatically command the haptic braking behavior feedback in response to receiving the brake pedal position signal S1 from the sensor 70 of the brake pedal 58. Thereafter, in response to receiving the wireless signals 80 from the communication system 64, the connected smart device 56 may provide haptic braking behavior feedback to the driver 99.

In an embodiment, the haptic feedback that is provided by the smart device 56 is proportional to a distance that the current position of the brake pedal 58 is from an ideal brake pedal position for recapturing maximum regenerative braking energy. For example, as schematically illustrated in FIGS. 3 and 4, the smart device 56 may provide a first haptic feedback HP1 of a first intensity in response to a first braking event in which a first amount of regenerative braking energy is recaptured (see FIG. 3) and may provide a second haptic feedback HP2 of a second, lesser intensity in response to a second braking event in which a second, greater amount of braking energy is recaptured (see FIG. 4). The haptic braking behavior feedback therefore coaches the driver 99 to achieve maximum regenerative braking, thus improving fuel economy and customer satisfaction.

In an embodiment, the smart device 56 is commanded to vibrate to provide the haptic braking behavior feedback. However, the smart device 56 could alternatively or additionally provide audible, visual, or any other types or combinations of haptic feedback within the scope of this disclosure.

Figure 5:
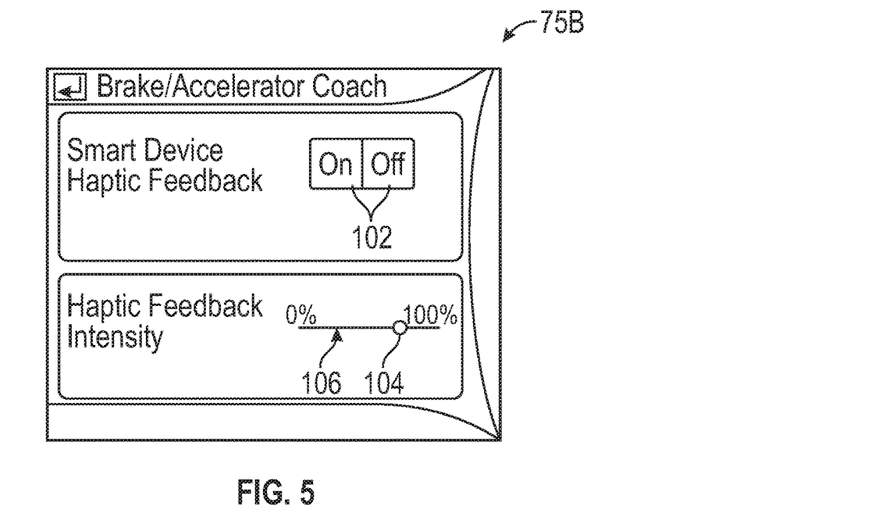
FIG. 5 illustrates a user interface of a human machine interface system of the vehicle system of FIG. 2.

The brake coach feature described above may be a selectable feature that can be enabled or disabled by the driver 99. For example, as shown in FIG. 5, the driver 99 may select the brake coach feature using another user interface 75B of the HMI system 62. The driver 99 may turn the brake coach feature ON or OFF by toggling tactile buttons 102 of the user interface 75B. The driver 99 may additionally adjust the intensity of the haptic feedback by dragging a toggle 104 along a scale 106 of the user interface 75B.

Figure 6:
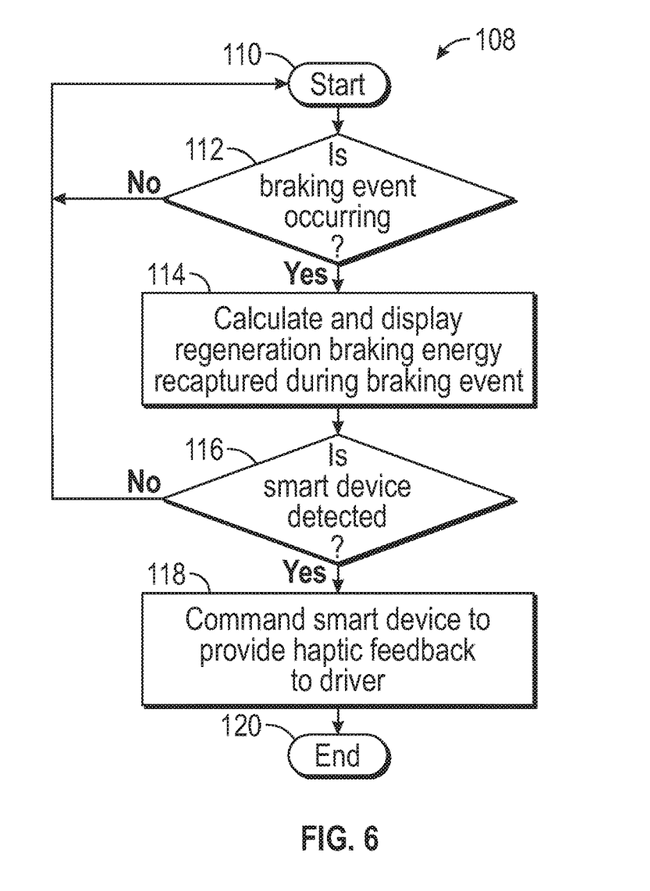
FIG. 6 schematically illustrates an exemplary method for providing haptic feedback to a driver during a braking event of an electrified vehicle.

FIG. 6, with continued reference to FIGS. 1-5, schematically illustrates an exemplary method 108 for providing haptic feedback, through the smart device 56, to the driver 99 during a braking event of the electrified vehicle 12. In an embodiment, the control module 82 of the control system 66 is programmed with one or more algorithms adapted to execute the exemplary method 108.

The method 108 begins at block 110. This embodiment assumes that the brake coach feature has already been enabled by the driver 99. At block 112, the control module 82 determines whether a braking event is occurring. For example, the control module 82 may analyze the brake pedal position signals S1 from the sensor 70 associated with the brake pedal 58 to determine whether the braking event is occurring.

If the braking event is occurring, the method 108 may proceed to block 114 by calculating and displaying the amount of regenerative braking energy that has been recaptured during the braking event. In an embodiment, the regenerative braking energy is dynamically calculated and is based at least on the input power of the motor 22. In another embodiment, the amount of regenerative braking energy is based on the amount of friction brake usage during a braking event. For example, if the driver requests an amount of braking force that exceeds the regenerative braking threshold, then the excess braking force achieved via the friction brakes. The amount of energy that was not captured due to the friction brake usage can be used to calculate the brake score, which is displayed as a percentage of total energy available for that braking event (assuming no extra friction braking was needed). The amount of regenerative braking energy that is recaptured may be displayed on the user interface 75A or any other user interface of the HMI system 62.

Next, at block 116, the control module 82 may detect whether or not the smart device 56 is located within the passenger cabin 68 of the electrified vehicle 12. This may include communicating with the smart device 56 via the communication system 64. If the smart device 56 is detected, the method 108 proceeds to block 118 at which the control module 82 commands the smart device 56 to provide haptic braking behavior feedback to the driver 99. In an embodiment, the smart device 56 is commanded to vibrate at a specific intensity to provide haptic feedback that is proportional to a distance the current position of the brake pedal 58 is from an ideal brake pedal position for recapturing maximum regenerative braking energy. The method 108 may then end at block 120.

Figures 7, 8:
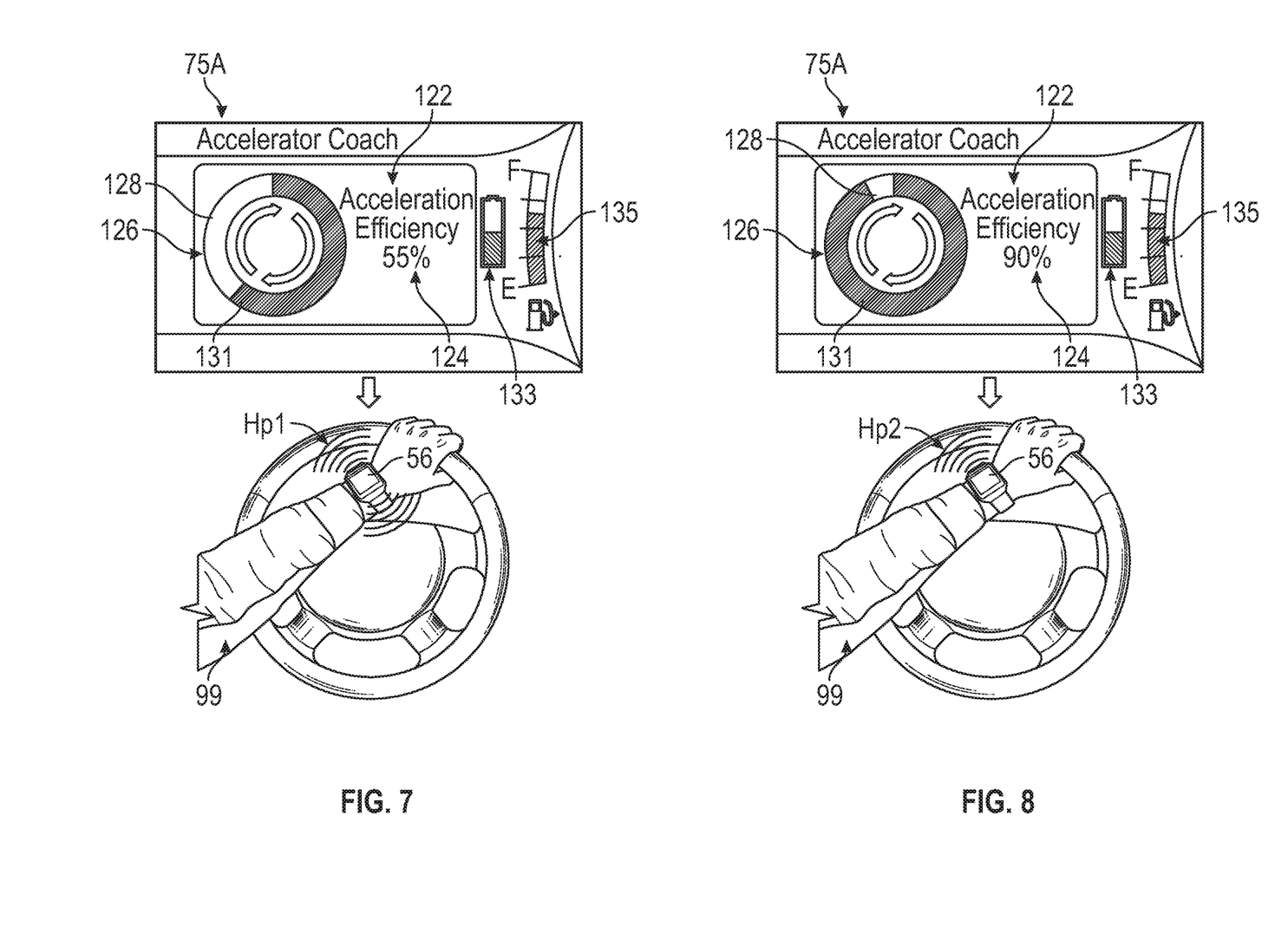
FIGS. 7 and 8 schematically illustrate an accelerator coach feature of an electrified vehicle.

In another embodiment, the control module 82 of the control system 66 is programmed to execute an accelerator coach feature of the electrified vehicle 12. The accelerator coach feature is schematically illustrated in FIGS. 7 and 8 (with continued reference to FIG. 2).

A first aspect of the accelerator coach feature is the ability to provide the driver 99 with visual acceleration behavior feedback on the user interface 75A of the HMI system 62 during acceleration events. The user interface 75A may include an acceleration efficiency indicator 122 for digitally displaying an acceleration efficiency score 124 alphanumerically. The user interface 75A may additionally include an acceleration efficiency gauge 126 for conveying the acceleration efficiency score 124 graphically. The acceleration efficiency gauge 126 may include a circular ring 128 and a status bar 131 adapted to move within the circular ring 128 to indicate the acceleration efficiency during the acceleration event. The location at which the status bar 131 ends within the circular ring 128 may correspond to the acceleration efficiency score 124. The user interface 75A may also include a state of charge indicator 133 for graphically illustrating the amount of energy stored in the battery pack 24 (see FIG. 1) and a fuel level indicator 135 for graphically illustrating the amount of fuel stored in the fuel tank for powering the engine 14 (see FIG. 1).

In addition to displaying various visual acceleration behavior feedback on the user interface 75A, the acceleration coach feature may be configured to provide haptic acceleration behavior feedback during acceleration events through the smart device 56 worn by the driver 99 of the electrified vehicle 12. The control module 82 may automatically command the haptic acceleration behavior feedback in response to receiving and analyzing the accelerator pedal position signals S2 from the sensor 72 associated with the accelerator pedal 60. Thereafter, in response to receiving the wireless signals 80 from the communication system 64, the connected smart device 56 may provide haptic accelerator behavior feedback to the driver 99.

In an embodiment, the haptic feedback that is provided by the smart device 56 is proportional to a distance that the current position of the accelerator pedal 60 is from an ideal accelerator pedal position for achieving maximum fuel economy. For example, as schematically illustrated in FIGS. 7 and 8, the smart device 56 may provide a first haptic feedback HP1 of a first intensity in response to a first acceleration event that achieves a first acceleration efficiency (see FIG. 7) and may provide a second haptic feedback HP2 of a second, lesser intensity in response to a second acceleration event that achieves a second, greater acceleration efficiency (see FIG. 8). The haptic acceleration behavior feedback therefore coaches the driver 99 to operate the accelerator pedal 60 for maximum vehicle efficiency, thus improving fuel economy and customer satisfaction.

In an embodiment, the smart device 56 is instructed to vibrate in order to provide the haptic accelerator behavior feedback. However, the smart device 56 could alternatively or additionally provide audible, visual, or any other types of haptic feedback within the scope of this disclosure.

The accelerator coach feature described above may be a selectable feature. For example, as shown in FIG. 5, the driver 99 may select the accelerator coach feature using the user interface 75B of the HMI system 62. The driver 99 may turn the accelerator coach feature ON or OFF by toggling tactile buttons 102 of the user interface 75B. The driver 99 may additionally adjust the intensity of the haptic feedback by dragging a toggle 104 along a scale 106 of the user interface 75B.

Figure 9:
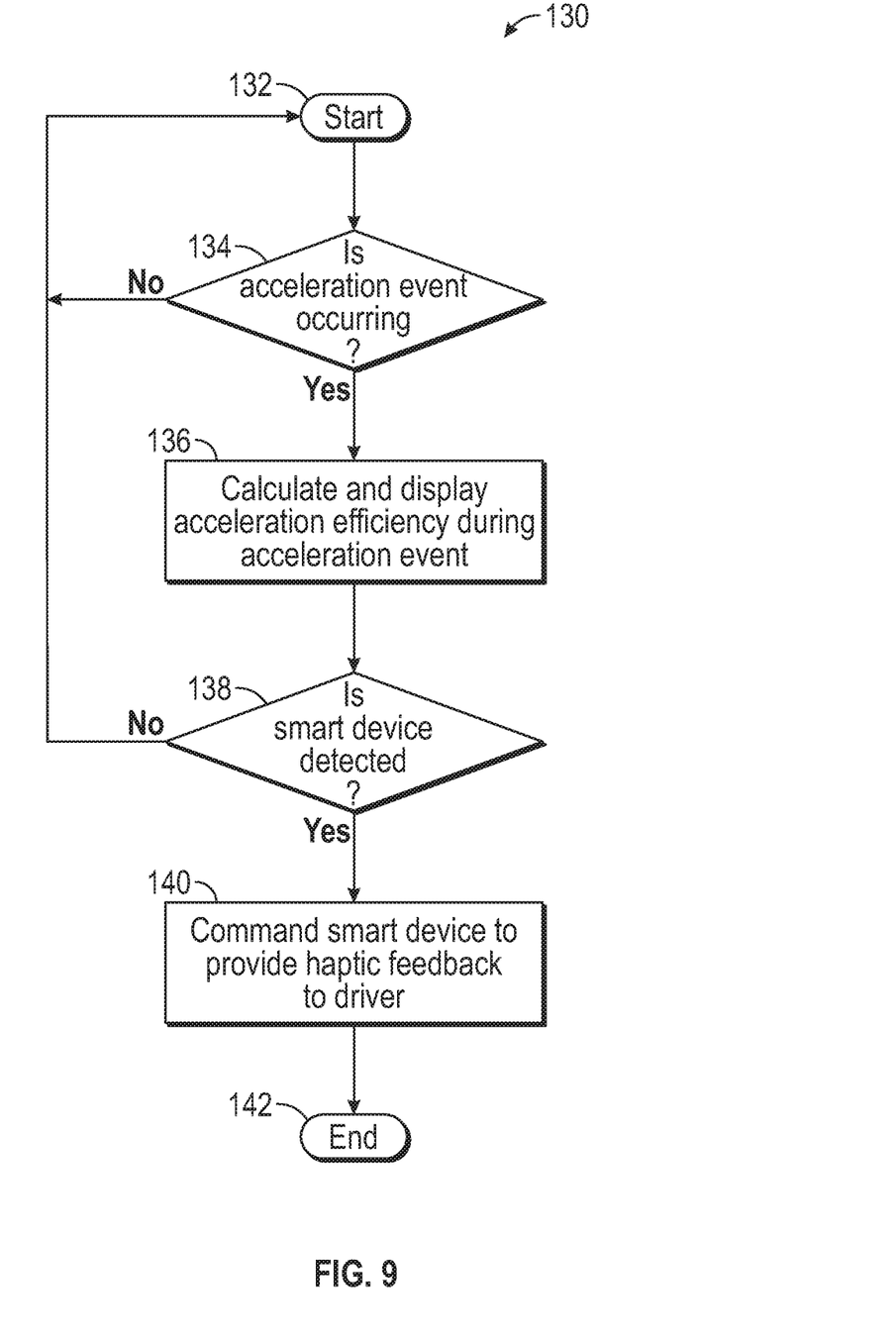
FIG. 9 schematically illustrates an exemplary method for providing haptic feedback to a driver during an acceleration event of an electrified vehicle.

FIG. 9, with continued reference to FIGS. 1-8, schematically illustrates an exemplary method 130 for providing haptic feedback, through the smart device 56, to the driver 99 during an acceleration event of the electrified vehicle 12. In an embodiment, the control module 82 of the control system 66 is programmed with one or more algorithms adapted to execute the exemplary method 130.

The method 130 begins at block 132. This embodiment assumes that the accelerator coach feature has been enabled by the driver 99. At block 134, the control module 82 determines whether an acceleration event is occurring. For example, the control module 82 may analyze the accelerator pedal position signals S2 from the sensor 72 of the accelerator pedal 60 to determine whether the acceleration event is occurring.

If the acceleration event is occurring, the method 130 may proceed to block 136 by calculating and displaying the acceleration efficiency during the acceleration event. In an embodiment, the acceleration efficiency is calculated based on at least the amount of battery power required and various efficiency operating points of the vehicle (e.g., BSFC map), etc. The acceleration efficiency achieved during the acceleration event may be displayed on the user interface 75A, for example.

Next, at block 138, the control module 82 may detect whether or not the smart device 56 is located within the passenger cabin 68 of the electrified vehicle 12. This may include communicating with the smart device 56 via the communication system 64. If the smart device 56 is detected, the method 130 proceeds to block 140 at which the control module 82 commands the smart device 56 to provide haptic acceleration behavior feedback to the driver 99. In an embodiment, the smart device 56 is commanded to vibrate at a specific intensity to provide haptic feedback that is proportional to a distance the current position of the accelerator pedal 60 is from an ideal accelerator pedal position for achieving maximum fuel economy. The method 130 may then end at block 142.

The vehicle systems and methods of this disclosure are designed to improve fuel economy and customer satisfaction by providing haptic feedback through a smart device worn by the vehicle drive during braking and acceleration events. The haptic feedback is designed to gently remind the driver to improve his/her driving behavior during the braking and acceleration events without the need for the driver to take his or her eyes off of the road ahead.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   during a braking or acceleration event of an electrified vehicle, providing haptic feedback of a driving behavior through a smart device worn by a driver of the electrified vehicle,
   wherein providing the haptic feedback includes instructing the smart device to provide a first haptic feedback of a first intensity in response to a first braking event in which a first amount of regenerative braking energy is recaptured and to provide a second haptic feedback of a second, different intensity in response to a second braking event in which a second, different amount of braking energy is recaptured.

2. The method as recited in claim 1, wherein the smart device is a smart watch or a smart band.

3. The method as recited in claim 1, wherein providing the haptic feedback includes commanding the smart device to vibrate, emit light, or emit sound.

4. The method as recited in claim 3, wherein commanding the smart device to vibrate includes vibrating the smart device at an intensity that is proportional to a distance that a current brake pedal position is from an ideal brake pedal position for recapturing maximum regenerative braking energy.

5. The method as recited in claim 3, wherein commanding the smart device to vibrate includes vibrating the smart device at an intensity that is proportional to a distance that a current accelerator pedal position is from an ideal accelerator pedal position for achieving maximum fuel economy.

6. The method as recited in claim 1, wherein providing the haptic feedback during the braking event includes coaching the driver, via the haptic feedback, to alter the driving behavior.

7. The method as recited in claim 6, wherein altering the driving behavior includes changing a current brake pedal position.

8. The method as recited in claim 1, wherein providing the haptic feedback during the acceleration event includes coaching the driver, via the haptic feedback, to alter the driving behavior.

9. The method as recited in claim 1, wherein altering the driving behavior includes changing a current accelerator pedal position.

10. The method as recited in claim 1, wherein the second, different intensity is less than the first intensity when the second, different amount of regenerative braking energy is greater than the first amount of regenerative braking energy.

11. A method, comprising:
during a braking or acceleration event of an electrified vehicle, providing haptic feedback of a driving behavior through a smart device worn by a driver of the electrified vehicle,
wherein providing the haptic feedback includes instructing the smart device to provide a first haptic feedback of a first intensity in response to a first acceleration event that achieves a first acceleration efficiency and to provide a second haptic feedback of a second, different intensity in response to a second acceleration event that achieves a second, different acceleration efficiency.

12. The method as recited in claim 11, wherein the second, different intensity is less than the first intensity when the second, different acceleration efficiency is greater than the first acceleration efficiency.

13. The method as recited in claim 1, comprising receiving a signal indicating that a brake or accelerator coach feature has been enabled by the driver prior to providing the haptic feedback.

14. The method as recited in claim 1, comprising detecting a presence of the smart device within a passenger cabin of the electrified vehicle prior to providing the haptic feedback.

15. An electrified vehicle, comprising:
a brake pedal;
an accelerator pedal; and
a control module configured to instruct a smart device worn by a driver of the electrified vehicle to provide haptic feedback to the driver when a position of the brake pedal is different from an ideal brake pedal position during a braking event or when a position of the accelerator pedal is different from an ideal accelerator pedal position during an acceleration event,
wherein the haptic feedback includes a first haptic feedback of a first intensity in response to a first braking event in which a first amount of regenerative braking energy is recaptured and a second haptic feedback of a second, different intensity in response to a second braking event in which a second, different amount of braking energy is recaptured; or
wherein the haptic feedback includes the first haptic feedback of the first intensity in response to a first acceleration event that achieves a first acceleration efficiency and the second haptic feedback of the second, different intensity in response to a second acceleration event that achieves a second, different acceleration efficiency.

16. The electrified vehicle as recited in claim 15, comprising a first sensor configured to detect the position of the brake pedal and a second sensor configured to detect the position of the accelerator pedal.

17. The vehicle system as recited in claim 15, comprising a communication system including a first Bluetooth Low Energy (BLE) transceiver configured to communicate with a second BLE transceiver of the smart device.

18. The vehicle system as recited in claim 15, comprising a human machine interface system having at least one user interface configured to display visual feedback to the driver during the braking event or the acceleration event.

19. The vehicle system as recited in claim 18, wherein the human machine interface system includes a second user interface configured to enable or disable a brake coach feature or an acceleration coach feature of the electrified vehicle.

* * * * *